United States Patent
Raponi et al.

(10) Patent No.: US 10,084,725 B2
(45) Date of Patent: Sep. 25, 2018

(54) EXTRACTING FEATURES FROM A NOC FOR MACHINE LEARNING CONSTRUCTION

(71) Applicant: NetSpeed Systems, Inc., San Jose, CA (US)

(72) Inventors: Pier Giorgio Raponi, San Jose, CA (US); Nishant Rao, San Jose, CA (US); Sailesh Kumar, San Jose, CA (US)

(73) Assignee: NETSPEED SYSTEMS, INC., San Jose, CA (US)

( * ) Notice: Subject to any disclaimer, the term of this patent is extended or adjusted under 35 U.S.C. 154(b) by 107 days.

(21) Appl. No.: 15/403,723

(22) Filed: Jan. 11, 2017

(65) Prior Publication Data

US 2018/0198734 A1  Jul. 12, 2018

(51) Int. Cl.
  *H04L 12/721* (2013.01)
  *H04L 12/933* (2013.01)
  (Continued)

(52) U.S. Cl.
  CPC ............ *H04L 49/109* (2013.01); *H04L 45/02* (2013.01); *H04L 45/16* (2013.01); *H04L 45/60* (2013.01); *H04L 49/102* (2013.01)

(58) Field of Classification Search
  CPC ......... H04L 41/12; H04L 45/06; H04L 49/10; H04L 49/109; H04L 45/38; H04L 12/66
  See application file for complete search history.

(56) References Cited

U.S. PATENT DOCUMENTS

| 4,409,838 A | 10/1983 | Schomberg |
| 4,933,933 A | 6/1990 | Dally et al. |

(Continued)

FOREIGN PATENT DOCUMENTS

| CN | 103684961 A | 3/2014 |
| JP | 5936793 | 5/2016 |

(Continued)

OTHER PUBLICATIONS

Ababei, C., et al., Achieving Network on Chip Fault Tolerance by Adaptive Remapping, Parallel & Distributed Processing, 2009, IEEE International Symposium, 4 pgs.

(Continued)

*Primary Examiner* — Sai Aung
(74) *Attorney, Agent, or Firm* — Procopio, Cory, Hargreaves & Savitch LLP

(57) ABSTRACT

The present disclosure is directed to extracting features from a NoC for machine learning construction. Example implementations include a method for generating a Network on Chip (NoC), wherein the method can extract at least one feature from a NoC specification to derive at least one of: grid features, traffic features and topological features associated with the NoC. The method can perform a process on the at least one of the grid features, the traffic features and the topological features associated with the NoC to determine at least one of an evaluation of at least one mapping strategy selected from a plurality of mapping strategies of the NoC based on a quality metric, and the selection of the at least one mapping strategy is based on the quality metric. The method can further perform generate the NoC based on the process.

19 Claims, 10 Drawing Sheets

(51) Int. Cl.
*H04L 12/761* (2013.01)
*H04L 12/773* (2013.01)
*H04L 12/751* (2013.01)

(56) References Cited

U.S. PATENT DOCUMENTS

| | | | |
|---|---|---|---|
| 5,105,424 A | 4/1992 | Flaig | |
| 5,163,016 A | 11/1992 | Har'El et al. | |
| 5,355,455 A | 10/1994 | Hilgendorf et al. | |
| 5,432,785 A | 7/1995 | Ahmed et al. | |
| 5,563,003 A | 10/1996 | Suzuki et al. | |
| 5,583,990 A | 12/1996 | Birrittella et al. | |
| 5,588,152 A | 12/1996 | Dapp et al. | |
| 5,764,740 A | 6/1998 | Holender | |
| 5,790,554 A | 8/1998 | Pitcher | |
| 5,859,981 A | 1/1999 | Levin et al. | |
| 5,991,308 A | 11/1999 | Fuhrmann et al. | |
| 5,999,530 A | 12/1999 | LeMaire | |
| 6,003,029 A | 12/1999 | Agrawal et al. | |
| 6,029,220 A | 2/2000 | Iwamura et al. | |
| 6,058,385 A | 5/2000 | Koza et al. | |
| 6,101,181 A | 8/2000 | Passint et al. | |
| 6,108,739 A | 8/2000 | James et al. | |
| 6,249,902 B1 | 6/2001 | Igusa et al. | |
| 6,314,487 B1 | 11/2001 | Hahn et al. | |
| 6,377,543 B1 | 4/2002 | Grover | |
| 6,415,282 B1 | 7/2002 | Mukherjea et al. | |
| 6,674,720 B1 | 1/2004 | Passint et al. | |
| 6,701,361 B1 | 3/2004 | Meier | |
| 6,711,717 B2 | 3/2004 | Nystrom et al. | |
| 6,778,531 B1 | 8/2004 | Kodialam | |
| 6,925,627 B1 | 8/2005 | Longway et al. | |
| 6,967,926 B1 | 11/2005 | Williams, Jr. et al. | |
| 6,983,461 B2 | 1/2006 | Hutchison et al. | |
| 7,046,633 B2 | 5/2006 | Carvey | |
| 7,065,730 B2 | 6/2006 | Alpert et al. | |
| 7,143,221 B2 | 11/2006 | Bruce et al. | |
| 7,318,214 B1 | 1/2008 | Prasad et al. | |
| 7,379,424 B1 | 5/2008 | Krueger | |
| 7,437,518 B2 | 10/2008 | Tsien | |
| 7,461,236 B1 | 12/2008 | Wentzlaff | |
| 7,509,619 B1 | 3/2009 | Miller et al. | |
| 7,564,865 B2 | 7/2009 | Radulescu | |
| 7,583,602 B2 | 9/2009 | Bejerano | |
| 7,590,959 B2 | 9/2009 | Tanaka | |
| 7,693,064 B2 | 4/2010 | Thubert et al. | |
| 7,701,252 B1 | 4/2010 | Chow et al. | |
| 7,724,735 B2 | 5/2010 | Locatelli et al. | |
| 7,725,859 B1 | 5/2010 | Lenahan et al. | |
| 7,774,783 B2 | 8/2010 | Toader | |
| 7,808,968 B1 | 10/2010 | Kalmanek, Jr. et al. | |
| 7,853,774 B1 | 12/2010 | Wentzlaff | |
| 7,917,885 B2 | 3/2011 | Becker | |
| 7,957,381 B2 | 6/2011 | Clermidy et al. | |
| 7,973,804 B2 | 7/2011 | Mejdrich et al. | |
| 8,018,249 B2 | 9/2011 | Koch et al. | |
| 8,020,163 B2 | 9/2011 | Nollet et al. | |
| 8,020,168 B2 | 9/2011 | Hoover et al. | |
| 8,050,256 B1 | 11/2011 | Bao et al. | |
| 8,059,551 B2 | 11/2011 | Milliken | |
| 8,098,677 B1 | 1/2012 | Pleshek | |
| 8,099,757 B2 | 1/2012 | Riedle et al. | |
| 8,136,071 B2 | 3/2012 | Solomon | |
| 8,203,938 B2 | 6/2012 | Gibbings | |
| 8,261,025 B2 | 9/2012 | Mejdrich et al. | |
| 8,281,297 B2 | 10/2012 | Dasu et al. | |
| 8,306,042 B1 | 11/2012 | Abts | |
| 8,312,402 B1 | 11/2012 | Okhmatovski et al. | |
| 8,352,774 B2 | 1/2013 | Elrabaa | |
| 8,407,425 B2 | 3/2013 | Gueron et al. | |
| 8,412,795 B2 | 4/2013 | Mangano et al. | |
| 8,438,578 B2 | 5/2013 | Hoover et al. | |
| 8,448,102 B2 | 5/2013 | Kornachuk et al. | |
| 8,490,110 B2 | 7/2013 | Hoover et al. | |
| 8,492,886 B2 | 7/2013 | Or-Bach et al. | |
| 8,503,445 B2 | 8/2013 | Lo | |
| 8,514,889 B2 | 8/2013 | Jayasimha | |
| 8,541,819 B1 | 9/2013 | Or-Bach et al. | |
| 8,543,964 B2 | 9/2013 | Ge et al. | |
| 8,572,353 B1 | 10/2013 | Bratt | |
| 8,601,423 B1 * | 12/2013 | Philip | G06F 17/5072 703/15 |
| 8,614,955 B2 | 12/2013 | Gintis | |
| 8,619,622 B2 | 12/2013 | Harrand et al. | |
| 8,635,577 B2 | 1/2014 | Kazda et al. | |
| 8,661,455 B2 | 2/2014 | Mejdrich et al. | |
| 8,667,439 B1 * | 3/2014 | Kumar | G06F 17/5031 716/106 |
| 8,705,368 B1 | 4/2014 | Abts et al. | |
| 8,711,867 B2 | 4/2014 | Guo et al. | |
| 8,717,875 B2 | 5/2014 | Bejerano et al. | |
| 8,726,295 B2 | 5/2014 | Hoover et al. | |
| 8,738,860 B1 | 5/2014 | Griffin et al. | |
| 8,793,644 B2 | 7/2014 | Michel et al. | |
| 8,798,038 B2 | 8/2014 | Jayasimha et al. | |
| 8,819,611 B2 | 8/2014 | Philip et al. | |
| 8,885,510 B2 | 11/2014 | Kumar et al. | |
| 9,160,627 B2 * | 10/2015 | Kumar | H04L 49/109 |
| 9,185,023 B2 * | 11/2015 | Norige | H04L 45/06 |
| 9,210,048 B1 | 12/2015 | Marr | |
| 2002/0071392 A1 | 6/2002 | Grover et al. | |
| 2002/0073380 A1 | 6/2002 | Cooke et al. | |
| 2002/0083159 A1 | 6/2002 | Ward et al. | |
| 2002/0095430 A1 | 7/2002 | Egilsson et al. | |
| 2003/0088602 A1 | 5/2003 | Dutta et al. | |
| 2003/0145314 A1 | 7/2003 | Nguyen et al. | |
| 2004/0049565 A1 | 3/2004 | Keller et al. | |
| 2004/0103218 A1 | 5/2004 | Blumrich et al. | |
| 2004/0216072 A1 | 10/2004 | Alpert et al. | |
| 2005/0147081 A1 | 7/2005 | Acharya et al. | |
| 2005/0203988 A1 | 9/2005 | Nollet et al. | |
| 2006/0002303 A1 | 1/2006 | Bejerano | |
| 2006/0031615 A1 | 2/2006 | Bruce et al. | |
| 2006/0075169 A1 | 4/2006 | Harris et al. | |
| 2006/0161875 A1 | 7/2006 | Rhee | |
| 2006/0206297 A1 | 9/2006 | Ishiyama et al. | |
| 2006/0209846 A1 | 9/2006 | Clermidy et al. | |
| 2006/0268909 A1 | 11/2006 | Langevin et al. | |
| 2007/0038987 A1 | 2/2007 | Ohara et al. | |
| 2007/0088537 A1 | 4/2007 | Lertora et al. | |
| 2007/0118320 A1 | 5/2007 | Luo et al. | |
| 2007/0147379 A1 | 6/2007 | Lee et al. | |
| 2007/0162903 A1 | 7/2007 | Babb, II et al. | |
| 2007/0244676 A1 | 10/2007 | Shang et al. | |
| 2007/0256044 A1 | 11/2007 | Coryer et al. | |
| 2007/0267680 A1 | 11/2007 | Uchino et al. | |
| 2007/0274331 A1 | 11/2007 | Locatelli et al. | |
| 2008/0072182 A1 | 3/2008 | He et al. | |
| 2008/0120129 A1 | 5/2008 | Seubert et al. | |
| 2008/0126569 A1 | 5/2008 | Rhim et al. | |
| 2008/0184259 A1 | 7/2008 | Lesartre et al. | |
| 2008/0186998 A1 | 8/2008 | Rijpkema | |
| 2008/0211538 A1 | 9/2008 | Lajolo et al. | |
| 2008/0232387 A1 | 9/2008 | Rijpkema et al. | |
| 2009/0037888 A1 | 2/2009 | Tatsuoka et al. | |
| 2009/0046727 A1 | 2/2009 | Towles | |
| 2009/0070726 A1 | 3/2009 | Mehrotra et al. | |
| 2009/0122703 A1 | 5/2009 | Gangwal et al. | |
| 2009/0125574 A1 | 5/2009 | Mejdrich | |
| 2009/0125706 A1 | 5/2009 | Hoover | |
| 2009/0135739 A1 | 5/2009 | Hoover | |
| 2009/0138567 A1 | 5/2009 | Hoover | |
| 2009/0172304 A1 | 7/2009 | Gueron et al. | |
| 2009/0187716 A1 | 7/2009 | Comparan et al. | |
| 2009/0187756 A1 | 7/2009 | Nollet et al. | |
| 2009/0210184 A1 | 8/2009 | Medardoni et al. | |
| 2009/0231348 A1 | 9/2009 | Mejdrich et al. | |
| 2009/0256836 A1 | 10/2009 | Fowler | |
| 2009/0268677 A1 | 10/2009 | Chou et al. | |
| 2009/0282222 A1 | 11/2009 | Hoover | |
| 2009/0282227 A1 | 11/2009 | Hoover | |
| 2009/0285222 A1 | 11/2009 | Hoover et al. | |
| 2009/0300292 A1 | 12/2009 | Fang | |
| 2009/0307714 A1 | 12/2009 | Hoover et al. | |

(56) References Cited

U.S. PATENT DOCUMENTS

| | | |
|---|---|---|
| 2009/0313592 A1 | 12/2009 | Murali et al. |
| 2010/0040162 A1 | 2/2010 | Suehiro |
| 2010/0158005 A1 | 6/2010 | Mukhopadhyay et al. |
| 2010/0211718 A1 | 8/2010 | Gratz et al. |
| 2010/0223505 A1 | 9/2010 | Andreev et al. |
| 2011/0022754 A1 | 1/2011 | Cidon et al. |
| 2011/0035523 A1 | 2/2011 | Feero et al. |
| 2011/0060831 A1 | 3/2011 | Ishii et al. |
| 2011/0072407 A1 | 3/2011 | Keinert et al. |
| 2011/0085550 A1 | 4/2011 | Lecler et al. |
| 2011/0085561 A1 | 4/2011 | Ahn |
| 2011/0103799 A1 | 5/2011 | Shacham et al. |
| 2011/0154282 A1 | 6/2011 | Chang et al. |
| 2011/0191774 A1 | 8/2011 | Hsu et al. |
| 2011/0235531 A1 | 9/2011 | Vangal et al. |
| 2011/0276937 A1 | 11/2011 | Waller |
| 2011/0302345 A1 | 12/2011 | Boucard et al. |
| 2011/0307734 A1 | 12/2011 | Boesen et al. |
| 2011/0320854 A1 | 12/2011 | Elrabaa |
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0079147 A1 | 3/2012 | Ishii et al. |
| 2012/0099475 A1 | 4/2012 | Tokuoka |
| 2012/0110106 A1 | 5/2012 | De Lescure et al. |
| 2012/0110541 A1 | 5/2012 | Ge et al. |
| 2012/0144065 A1 | 6/2012 | Parker |
| 2012/0155250 A1 | 6/2012 | Carney et al. |
| 2012/0173846 A1 | 7/2012 | Wang et al. |
| 2012/0195321 A1 | 8/2012 | Ramanujam |
| 2012/0209944 A1 | 8/2012 | Mejdrich et al. |
| 2012/0311512 A1 | 12/2012 | Michel |
| 2013/0028090 A1 | 1/2013 | Yamaguchi et al. |
| 2013/0028261 A1 | 1/2013 | Lee |
| 2013/0051397 A1 | 2/2013 | Guo et al. |
| 2013/0054811 A1 | 2/2013 | Harrand |
| 2013/0073771 A1 | 3/2013 | Hanyu |
| 2013/0080073 A1 | 3/2013 | de Corral |
| 2013/0103369 A1 | 4/2013 | Huynh et al. |
| 2013/0103912 A1 | 4/2013 | Jones et al. |
| 2013/0117543 A1 | 5/2013 | Venkataramanan et al. |
| 2013/0148506 A1 | 6/2013 | Lea |
| 2013/0151215 A1 | 6/2013 | Mustapha |
| 2013/0159944 A1 | 6/2013 | Uno et al. |
| 2013/0163615 A1 | 6/2013 | Mangano et al. |
| 2013/0174113 A1 | 7/2013 | Lecler et al. |
| 2013/0179613 A1 | 7/2013 | Boucard et al. |
| 2013/0179902 A1 | 7/2013 | Hoover et al. |
| 2013/0191572 A1 | 7/2013 | Nooney et al. |
| 2013/0207801 A1 | 8/2013 | Barnes |
| 2013/0219148 A1 | 8/2013 | Chen et al. |
| 2013/0250792 A1 | 9/2013 | Yoshida et al. |
| 2013/0254488 A1 | 9/2013 | Kaxiras et al. |
| 2013/0263068 A1 | 10/2013 | Cho et al. |
| 2013/0268990 A1 | 10/2013 | Urzi et al. |
| 2013/0326458 A1 | 12/2013 | Kazda et al. |
| 2014/0068132 A1 | 3/2014 | Philip et al. |
| 2014/0068134 A1 | 3/2014 | Philip et al. |
| 2014/0082237 A1 | 3/2014 | Wertheimer |
| 2014/0092740 A1 | 4/2014 | Wang et al. |
| 2014/0098683 A1 | 4/2014 | Kumar et al. |
| 2014/0112149 A1 | 4/2014 | Urzi et al. |
| 2014/0115218 A1 | 4/2014 | Philip et al. |
| 2014/0115298 A1 | 4/2014 | Philip et al. |
| 2014/0126572 A1 | 5/2014 | Hutton |
| 2014/0211622 A1 | 7/2014 | Kumar et al. |
| 2014/0254388 A1 | 9/2014 | Kumar et al. |
| 2014/0301241 A1* | 10/2014 | Kumar ............... H04L 49/109 370/254 |
| 2015/0036536 A1* | 2/2015 | Kumar ............... H04L 41/12 370/254 |
| 2015/0043575 A1 | 2/2015 | Kumar et al. |
| 2015/0109024 A1 | 4/2015 | Abdelfattah et al. |
| 2015/0159330 A1 | 6/2015 | Weisman et al. |
| 2015/0331831 A1 | 11/2015 | Solihin |
| 2017/0061053 A1 | 3/2017 | Kumar et al. |
| 2017/0063625 A1 | 3/2017 | Philip et al. |
| 2017/0063697 A1 | 3/2017 | Kumar |

FOREIGN PATENT DOCUMENTS

| | | |
|---|---|---|
| JP | 6060316 B2 | 1/2017 |
| KR | 10-2013-0033898 A1 | 4/2013 |
| KR | 101652490 | 8/2016 |
| WO | 2010074872 A1 | 7/2010 |
| WO | 2013063484 A1 | 5/2013 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Gindin, R., et al., NoC-Based FPGA: Architecture and Routing, Proceedings of the First International Symposium on Networks-on-Chip (NOCS'07), May 2007, pp. 253-262.

Grot, B., Preemptive Virtual Clock: A Flexible, Efficient, and Cost-Effective QOS Scheme for Networks-on-Chip, Micro '09, December Dec. 16, 2009, 12 pgs.

Grot, B., Kilo-NOC: A Heterogeneous Network-on-Chip Architecture for Scalability and Service Guarantees, ISCA 11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Hestness, J., et al., Netrace: Dependency-Tracking for Efficient Network-on-Chip Experimentation, The University of Texas at Austin, Dept. of Computer Science, May 2011, 20 pgs.

Jiang, N., et al., Performance Implications of Age-Based Allocations in On-Chip Networks, CVA Memo 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71 (5), May 2011, 14 pgs.

Lin, S., et al., Scalable Connection-Based Flow Control Scheme for Application-Specific Network-on-Chip, The Journal of China Universities of Posts and Telecommunications, Dec. 2011, 18(6), pp. 98-105.

Bolotin, Evgency, et al., "QNoC: QoS Architecture and Design Process for Network on Chip" 2004, 24 pages, Journal of Systems Architecture 50 (2004) 105-128 Elsevier.

Holsmark, Shashi Kumar Rickard, et al., "HiRA: A Methodology for Deadlock Free Routing in Hierarchical Networks on Chip", 10 pages, (978-1-4244-4143-3/09 2009 IEEE).

Munirul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.

Rajesh BV, Shivaputra, "NoC: Design and Implementation of Hardware Network Interface With Improved Communication Reliability", 7 pages, International Journal of VLSI and Embedded Systems, IJIVES (vol. 04, Article 06116; Jun. 2013).

(56) References Cited

OTHER PUBLICATIONS

Yang, J., et al., Homogeneous NoC-based FPGA: The Foundation for Virtual FPGA, 10th IEEE International Conference on Computer and Information Technology (CIT 2010), Jun. 2010, pp. 62-67.

Zaman, Aanam, "Formal Verification of Circuit-Switched Network on Chip (NoC) Architectures using SPIN", Oosman Hasan, IEEE © 2014, 8 pages.

Benini, Luca, et al., "Networks on Chips: A New SoC Paradigm", IEEE Computers, SOC Designs, pp. 70-78, Copyright 2002 IEEE. 0018-9162/02.

Sethuraman, Ranga Vemuri Balasubramanian, "optiMap: A Tool for Automated Generation of NoC Architecture Using Multi-Port Routers for FPGAs", IEEE, pp. 1-6, 2006.

International Search Report and Written Opinion for PCT/US2014/060745, dated Jan. 21, 2015, 10 pgs.

International Search Report and Written Opinion for PCT/US2014/060879, dated Jan. 21, 2015, 10 pgs.

International Search Report and Written Opinion for PCT/US2014/060892, dated Jan. 27, 2015, 10 pgs.

International Search Report and Written Opinion for PCT/US2014/060886, dated Jan. 26, 2015, 10 pgs.

International Search Report and Written Opinion for PCT/US2013/064140, dated Jan. 22, 2014, 9 pgs.

International Search Report and Written Opinion for PCT/US2014/012003, dated Mar. 26, 2014, 9 pgs.

International Search Report and Written Opinion for PCT/US2014/012012, dated May 14, 2014, 9 pgs.

International Search Report and Written Opinion for PCT/US2014/023625, dated Jul. 10, 2014, 9 pgs.

International Preliminary Report on Patentability for International Application No. PCT/US2013/064140, dated Apr. 23, 2015, 6 pages.

Office Action for Korean Patent Application No. 10-2016-7019093 dated Sep. 8, 2016, 3 pages plus 1 page English translation. KIPO, Korea.

Notice of Allowance for for Korean Patent Application No. 10-2016-7019093 dated Dec. 5, 2016, 5 pages. KIPO, Korea.

International Search Report and Written Opinion for PCT/US2014/037902, dated Sep. 30, 2014, 14 pgs.

Office Action for Japanese Patent Application No. 2015-535898 dated Oct. 25, 2016, 2 pages English, 2 pages untranslated. Japan Patent Office.

Notice of Grant for Japanese Patent Application No. 2015-535898 dated Jan. 17, 2017, 3 pages, untranslated. Japan Patent Office.

International Search Report and Written Opinion for PCT/US2014/048190, dated Nov. 28, 2014, 11 pgs.

Office Action for Japanese Patent Application No. 2016-516030 dated Aug. 30, 2016, 2 pages, Japan Patent Office.

Decision to Grant for Japanese Patent Application No. 2016-516030 dated Nov. 22, 2016, 3 pages, untranslated, Japan Patent Office.

* cited by examiner

300

EXTRACTING FEATURES FROM A NOC FOR MACHINE LEARNING CONSTRUCTION

TECHNICAL FIELD

Methods and example implementations described herein are generally directed to data extraction, and more specifically, to extracting features from a Network-on-Chip (NoC) specification for automatic machine learning based NoC construction.

RELATED ART

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies 100 in which the routers can connect to one another to create the system network. Bi-directional rings (as shown in FIG. 1A, 2-D (two dimensional) mesh (as shown in FIG. 1B), and 2-D Torus (as shown in FIG. 1C) are examples of topologies in the related art. Mesh and Torus can also be extended to 2.5-D (two and half dimensional) or 3-D (three dimensional) organizations. FIG. 1D shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has its ports used, one connecting to the router 112 at the top layer and another connecting to the router 110 at the bottom layer. Routers 110 and 112 are at the bottom and top mesh layers respectively and therefore have only the upper facing port 113 and the lower facing port 114 respectively connected.

Packets are message transport units for intercommunication between various components. Routing involves identifying a path that is a set of routers and physical links of the network over which packets are sent from a source to a destination. Components are connected to one or multiple ports of one or multiple routers; with each such port having a unique identification (ID). Packets can carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2A pictorially illustrates an example of XY routing 200 in a two dimensional mesh. More specifically, FIG. 2A illustrates XY routing from node '34' to node '00'. In the example of FIG. 2A, each component is connected to only one port of one router. A packet is first routed over the X-axis till the packet reaches node '04' where the X-coordinate of the node is the same as the X-coordinate of the destination node. The packet is next routed over the Y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is a header flit, which holds information about this packet's route and key message level info along with payload data and sets up the routing behavior for all subsequent flits associated with the message. Optionally, one or more body flits follows the header flit, containing remaining payload of data. The final flit is a tail flit, which, in addition to containing last payload, also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there exist multiple route paths of equal length or number of hops between any pair of source and destination nodes. For example, in FIG. 2B, in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3A illustrates a two layer NoC 300. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3B, a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

System on Chips (SoCs) are becoming increasingly sophisticated, feature rich, and high performance by integrating a growing number of standard processor cores, memory and I/O subsystems, and specialized acceleration IPs. To address this complexity, NoC approach of connecting SoC components is gaining popularity. A NoC can provide connectivity to a plethora of components and interfaces and simultaneously enable rapid design closure by being automatically generated from a high level specification. The specification describes interconnect requirements of SoC in terms of connectivity, bandwidth, and latency. The specification can include constraints such as Bandwidth/Quality of Service (QoS)/latency attributes that are to be met by the NoC, and can be, in various software formats, depending on the design tools, utilized. Once NoC is generated through the use of design tools on the specification to meet specification requirements, physical architecture can be implemented either by manufacturing a chip layout to facilitate NoC or by generation of a register transfer level (RTL) for execution on a chip to emulate the generated NoC, depending on desired implementation. Specifications may be in common power format (CPF), Unified Power Format (UPF), or others according to the desired specification.

Specifications can be in the form of traffic specifications indicating the traffic, bandwidth requirements, latency requirements, interconnections, etc depending on the desired implementation. Specifications can also be in the form of power specifications to define power domains, voltage domains, clock domains, and so on, depending on the desired implementation.

Specification can include parameters for bandwidth, traffic, jitter, dependency information, and attribute information depending on the desired implementation. In addition to this, information such as position of various components, protocol information, clocking and power domains, etc. may be supplied. A NoC compiler can then use this specification to automatically design a NoC for the SoC A number of NoC compilers were introduced in the related art that automatically synthesize a NoC to fit a traffic specification. In such design flows, synthesized NoC is simulated to evaluate performance under various operating conditions and to determine whether the specifications are met. This may be necessary because NoC-style interconnects are distributed systems and their dynamic performance characteristics under load are difficult to predict statically and can be very sensitive to a wide variety of parameters.

FIG. 4 illustrates an exemplary system 400 with two hosts and two flows represented as an exemplary traffic specification. Such traffic specifications are usually in the form of an edge-weighted digraph, where each node in the graph is a host in the network, and where edges represent traffic sent from one node to another. Furthermore, weights indicate bandwidth of traffic. Such specifications are sometimes annotated with latency requirements for each flow, indicating a limit on transfer time. System 400 illustrates connection between a first host such as a CPU 402, and a second host such as a memory unit 404 with two traffic flows (406 and 408) between them, wherein first flow is a 'load request' 406 from CPU 402 to memory 404, and second flow is 'load data' 408 sent back from the memory 404 to the CPU 402. This traffic flow information can be described in the specification of the NoC and used for designing and simulating the NoC.

However, specifications may have following limitations in addition to other un-cited limitations. The first limitation of the specification is that the information included therein may not be enough for satisfying dynamic or real time requirements for hosts of SoC through the NoC. Though the specification can include information on external dependencies between ports of different hosts, information on internal dependencies of hosts and/or messages/packets are not included. The second limitation of flow level specification is that network simulations performed, such as using point to point traffic represented by the flows in flow level specification, may not be sufficient enough, or may be inaccurate because of other missing information such as the interdependency information.

Further, it is also a known issue that based on requirements of the system or users of the system, specification may have to be configured and/or altered to match expectation or real time requirements such as traffic specifications or power specification. Thus, there is an ambiguity in the specifications that may be appropriate for designing a NoC as the system requirements may vary from one system to other. This further leads to substantial time consumption in revising or altering the specification received and then again checking for achievement of the desired system requirements.

Furthermore, in an NoC interconnect, if the traffic profile is not uniform and there is a certain amount of heterogeneity (e.g., certain hosts talking to each other more frequently than the others), the interconnect performance may depend on NoC topology and further depend on where various hosts are placed in the topology with respect to each other and to what routers are they connected to. For example, if two hosts talk to each other frequently and require higher bandwidth than other interconnects, they should be placed next to each other. This will reduce the latency for this communication, which thereby reduces global average latency as well as reduce number of router nodes and links over which higher bandwidth of this communication must be provisioned.

Also, the performance of an NoC design depends on a number of parameters such as area, bandwidth, latency, among others, all of which need to be kept in mind while manually designing an NoC, which process is time-consuming and expensive given the number of iterations/changes that are required to be done in order to obtain a design that meets all the required constraints. Hence, in view of the above limitations discussed, it can be difficult to evaluate whether the NoC design finally obtained is actually the most optimal and efficient one or not.

Therefore, there exists a need for methods, systems, and computer readable mediums for extracting features from a Network-on-Chip (NoC) specification for automatic machine learning construction of a plurality of NoC generation strategies for a quality metric, thereby creating a common representation to transform the network, and to have reference for all possible NoCs independent of size.

SUMMARY

Aspects of the present disclosure relate to methods, systems, and computer readable mediums for extracting features from a Network-on-Chip (NoC) specification for automatic machine learning construction of a plurality of NoC generation strategies for a quality metric. Such extracted features from the NoC specification can be achieved by utilizing a machine learning process that is generated through a machine learning method trained for a plurality of NoC generation strategies for arriving at a quality metric. Furthermore, such extracted features from the NoC specification can be compared to other NoCs for creating a common representation to transform a network, and can have reference to all possible NoCs independent of size.

An aspect of the present disclosure relates to a method for generating a Network on Chip (NoC), wherein the method can extract at least one feature from a NoC specification to derive at least one of: grid features, traffic features, and topological features associated with the NoC. The method of the present disclosure can perform a process on the at least one of the grid features, the traffic features, and the topological features associated with the NoC so as to determine at least one of: an evaluation of at least one mapping strategy selected from a plurality of mapping strategies of the NoC based on a quality metric, and the selection of the at least one mapping strategy is based on the quality metric. The process can be a machine learning process that can be generated through a machine learning method trained for a plurality of NoC generation strategies for a quality metric based on an application of the grid features, the traffic features, and the topological features of the NoC. Method of the present disclosure can further generate the NoC based on the process.

In an example implementation, to extract the at least one feature from the NoC specification to derive the grid features, method of the present disclosure can determine blockages associated with one or more links and one or more nodes of the NoC; remove locations of the one or more nodes without one or more bridges or blockages associated with the one or more links based on the blockages and bridge positions of the NoC; determine a bounding area for the NoC based on the removal of the locations; project the bounding area onto a grid; and determine the bridge positions and availability of the one or more links from the grid.

In an example implementation, in order to extract the at least one feature from the NoC specification to derive the topological features, method of the present disclosure can determine a list of links available per pair of nodes of the NoC.

In an example implementation, in order to extract at least one feature from the NoC specification to derive the traffic features, a method of the present disclosure can determine a representation for each interface of the NoC based on determination of an interface type from a plurality of interface types for the each interface; and determine, based on at least one traffic flow of the NoC, a type of each bridge based on an even or an odd hop position of the each bridge within the at least one traffic flow.

In an example implementation, in order to extract the at least one feature from the NoC specification to derive the traffic features, a method of the present disclosure can determine one or more transmission rates and/or one or more receiving rates of each node of the NoC; determine number of single beat and multi-beat interfaces per node; and determine number of even bridges and odd bridges for each node of the NoC.

In an example implementation, the quality metric can be based on parameters such as, but not limited, to a link cost or a flop cost or a latency cost or a bandwidth cost.

In an aspect, the present disclosure relates to system for generating a Network on Chip (NoC). The system includes a feature extraction module, a mapping module, and a generation module. In an aspect, the feature extraction module extracts at least one feature from a NoC specification to derive at least one of: grid features, traffic features, and topological features associated with the NoC. The mapping module performs a process on the at least one of the grid features, the traffic features, and the topological features associated with the NoC so as to determine at least one of: an evaluation of at least one mapping strategy selected from a plurality of mapping strategies of the NoC based on a quality metric, and the selection of at least one mapping strategy is based on the quality metric. In an example implementation, the process can be a machine learning process generated through a machine learning method trained for a plurality of NoC generation strategies for a quality metric based on an application of the grid features, the traffic features, and the topological features of the NoC. In an aspect, the generation module can generate the NoC based on the process.

In an aspect, the present disclosure relates to a non-transitory computer readable storage medium storing instructions for executing a process. The instructions can extract at least one feature from a NoC specification to derive at least one of: grid features, traffic features, and topological features associated with the NoC. The instructions of the present disclosure can perform a process on at least one of the grid features, the traffic features, and the topological features associated with the NoC so as to determine at least one of an evaluation of at least one mapping strategy selected from a plurality of mapping strategies of the NoC based on a quality metric, and the selection of the at least one mapping strategy is based on the quality metric. The first process can be a machine learning based process that can be configured to determine arrival rate of packets and drain rate of packets based on an arbitration process of the NoC. The process can be a machine learning process that can be generated through a machine learning method trained for a plurality of NoC generation strategies for a quality metric based on an application of the grid features, the traffic features and the topological features of the NoC. The instructions of the present disclosure can further perform generation of the NoC based on the process.

DETAILED DESCRIPTION

Figure 1A:
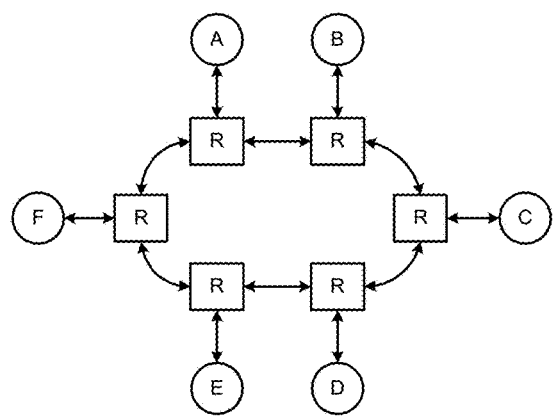
FIGS. 1A, 1B, 1C, and 1D illustrate examples of Bidirectional ring, 2D Mesh, 2D Torus, and 3D Mesh NoC Topologies.
Figure 1B:
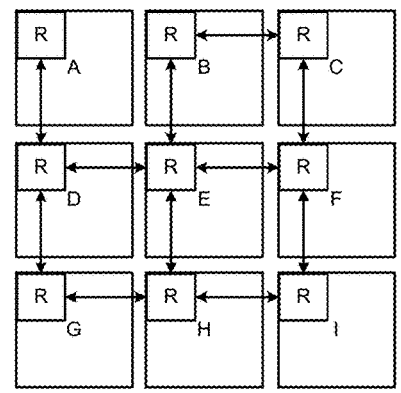
Figure 1C:
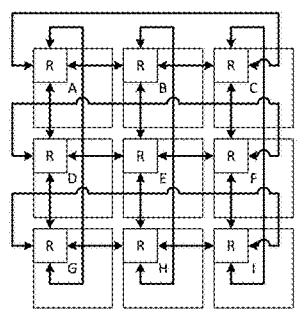
Figure 1D:
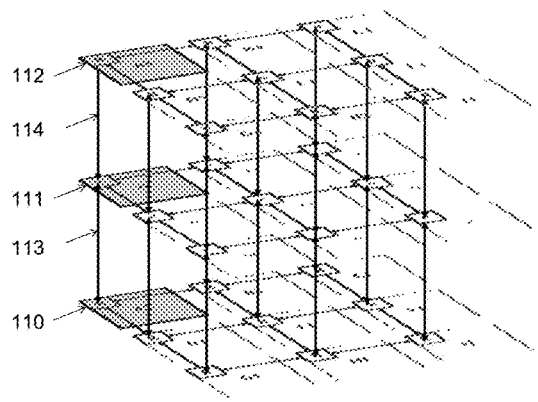
Figure 2A:
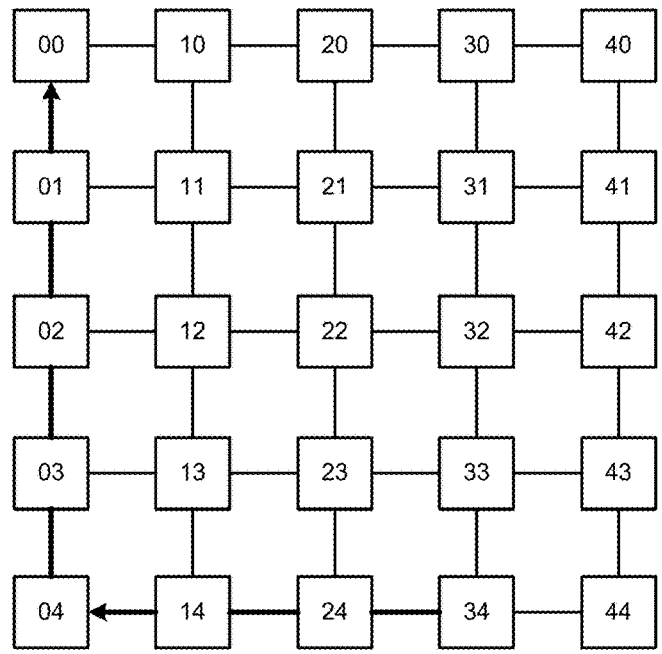
FIG. 2A illustrates an example of XY routing in a related art two dimensional mesh.
Figure 2B:
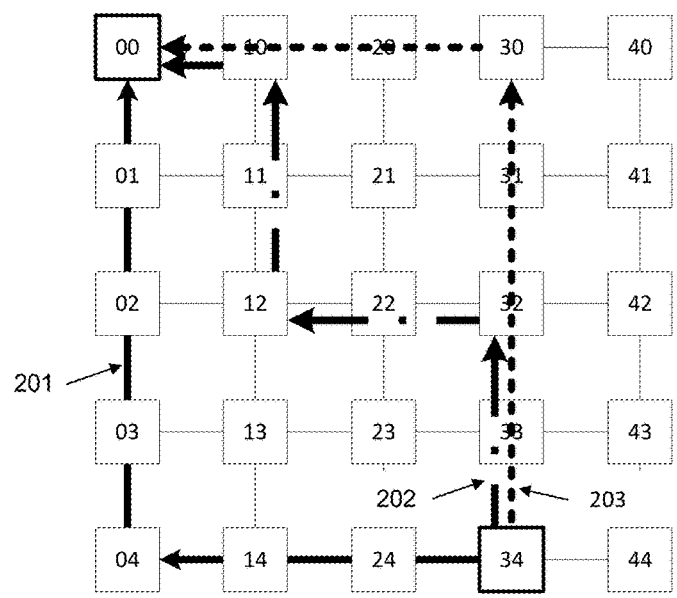
FIG. 2B illustrates three different routes between a source and destination nodes.
Figure 3A:
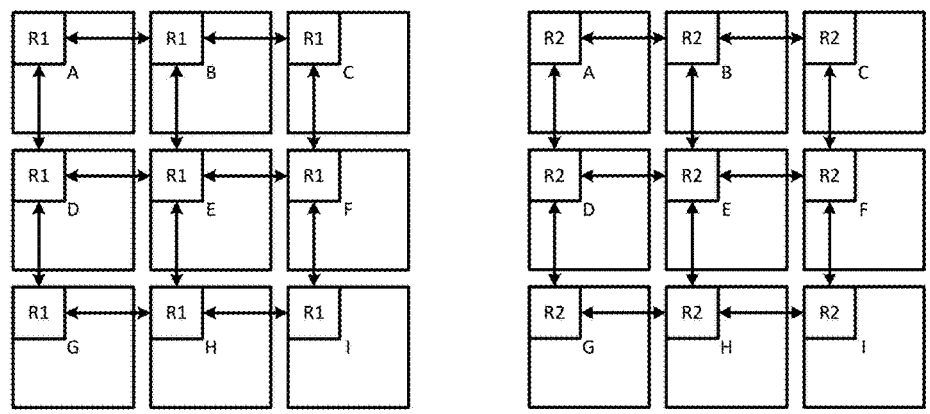
FIG. 3A illustrates an example of a related art two layer NoC interconnect.
Figure 3B:
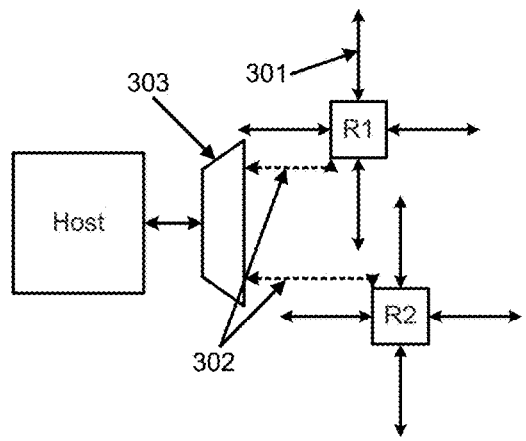
FIG. 3B illustrates the related art bridge logic between host and multiple NoC layers.
Figure 4:
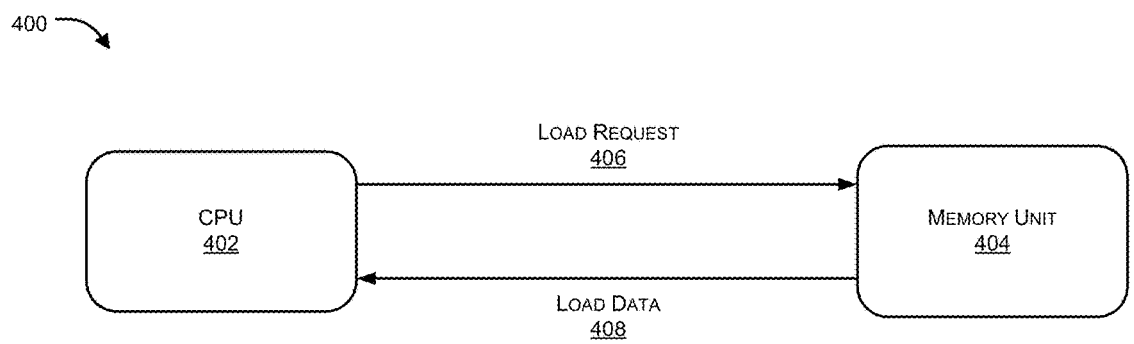
FIG. 4 illustrates an existing system with two hosts and two flows represented as an exemplary traffic specification.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Network-on-Chip (NoC) has emerged as a paradigm to interconnect a large number of components on the chip. NoC is a global shared communication infrastructure made up of several routing nodes interconnected with each other using point-to-point physical links. In example implementations, a NoC interconnect is generated from a specification by utilizing design tools. The specification can include constraints such as bandwidth/Quality of Service (QoS)/latency attributes that is to be met by the NoC, and can be in various software formats depending on the design tools utilized. Once the NoC is generated through the use of design tools on the specification to meet the specification requirements, the physical architecture can be implemented either by manufacturing a chip layout to facilitate the NoC or by generation of a register transfer level (RTL) for execution on a chip to emulate the generated NoC, depending on the desired implementation. Specifications may be in common power format (CPF), Unified Power Format (UPF), or others according to the desired specification. Specifications can be in the form of traffic specifications indicating the traffic, bandwidth requirements, latency requirements, interconnections, etc. depending on the desired implementation. Specifications can also be in the form of power specifications to define power domains, voltage domains, clock domains, and so on, depending on the desired implementation.

Example implementations are directed to the utilization of machine learning based algorithms. In the related art, a wide range of machine learning based algorithms have been applied to image or pattern recognition, such as the recognition of obstacles or traffic signs of other cars, or the categorization of elements based on a specific training. In view of the advancement in power computations, machine learning has become more applicable for the generation of NoCs and for the mapping of traffic flows of NoCs.

Example implementations are directed to the utilization of machine learning based algorithms. In the related art, a wide range of machine learning based algorithms have been applied to image or pattern recognition, such as the recognition of obstacles or traffic signs of other cars, or the categorization of elements based on a specific training. In view of the advancement in power computations, machine learning has become more applicable for the generation of NoCs and for the mapping of traffic flows of NoCs.

Aspects of the present disclosure relate to methods, systems, and computer readable mediums for extracting features from a Network-on-Chip (NoC) specification for automatic machine learning construction of a plurality of NoC generation strategies for a quality metric. Such extracted features from the NoC specification can be achieved by utilizing a machine learning process that is generated through a machine learning method trained for a plurality of NoC generation strategies for arriving at a quality metric. Furthermore, such extracted features from the NoC specification can be compared to other NoCs for creating a common representation to transform a network, and can have reference to all possible NoCs independent of size.

An aspect of the present disclosure relates to a method for generating a Network on Chip (NoC), wherein the method can extract at least one feature from a NoC specification to derive at least one of: grid features, traffic features, and topological features associated with the NoC. The method of the present disclosure can perform a process on the at least one of the grid features, the traffic features, and the topological features associated with the NoC so as to determine at least one of: an evaluation of at least one mapping strategy selected from a plurality of mapping strategies of the NoC based on a quality metric, and the selection of the at least one mapping strategy is based on the quality metric. The process can be a machine learning process that can be generated through a machine learning method trained for a plurality of NoC generation strategies for a quality metric based on an application of the grid features, the traffic features, and the topological features of the NoC. Method of the present disclosure can further generate the NoC based on the process.

In an example implementation, to extract at least one feature from the NoC specification to derive the grid features, method of the present disclosure can determine blockages associated with one or more links and one or more nodes of the NoC; remove locations of the one or more nodes without one or more bridges or blockages associated with the one or more links based on the blockages and bridge positions of the NoC; determine a bounding area for the NoC based on the removal of the locations; project the bounding area onto a grid; and determine the bridge positions and availability of the one or more links from the grid.

In an example implementation, in order to extract the at least one feature from the NoC specification to derive the topological features, method of the present disclosure can determine a list of links available per pair of nodes of the NoC.

In an example implementation, in order to extract the at least one feature from the NoC specification to derive the traffic features, method of the present disclosure can determine a representation for each interface of the NoC based on determination of an interface type from a plurality of interface types for the each interface; and determine, based on at least one traffic flow of the NoC, a type of each bridge based on an even or an odd hop position of the each bridge within the at least one traffic flow. In an example implementation, the type of each bridge can generally be determined based on the position of the bridge in the NoC.

In an example implementation, in order to extract the at least one feature from the NoC specification to derive the traffic features, method of the present disclosure can determine one or more transmission rates and/or one or more receiving rates of each node of the NoC; determine number of single beat and multi-beat interfaces per node; and determine number of even bridges and odd bridges for each node of the NoC.

In an example implementation, the quality metric can be based on parameters such as, but not limited, to a link cost or a flop cost or a latency cost or a bandwidth cost.

In an aspect, the present disclosure relates to system for generating a Network on Chip (NoC). The system includes a feature extraction module, a mapping module, and a generation module. In an aspect, the feature extraction module extracts at least one feature from a NoC specification to derive at least one of: grid features, traffic features, and topological features associated with the NoC. The mapping module performs a process on the at least one of the grid features, the traffic features, and the topological features associated with the NoC so as to determine at least one of: an evaluation of at least one mapping strategy selected from a plurality of mapping strategies of the NoC based on a quality metric, and the selection of the at least one mapping strategy is based on the quality metric. In an example implementation, the process can be a machine learning process generated through a machine learning method trained for a plurality of NoC generation strategies for a quality metric based on an application of the grid features, the traffic features, and the topological features of the NoC. In an aspect, the generation module can generate the NoC based on the process.

In an aspect, the present disclosure relates to a non-transitory computer readable storage medium storing instructions for executing a process. The instructions can extract at least one feature from a NoC specification to derive at least one of: grid features, traffic features, and topological features associated with the NoC. The instructions of the present disclosure can perform a process on the at least one of the grid features, the traffic features, and the topological features associated with the NoC so as to determine at least one of an evaluation of at least one mapping strategy selected from a plurality of mapping strategies of the NoC based on a quality metric, and the selection of the at least one mapping strategy is based on the quality metric. The first process can be a machine learning based process that can be configured to determine arrival rate of packets and drain rate of packets based on an arbitration process of the NoC. The process can be a machine learning process that can be generated through a machine learning method trained for a plurality of NoC generation strategies for a quality metric based on an application of the grid features, the traffic features and the topological features of the NoC. The instructions of the present disclosure can further perform generate the NoC based on the process. In an example implementation, the instructions for extracting the at least one feature from the NoC specification to derive the grid can further extract physical characteristics of the NoC from the NoC specification.

In an example implementation, the features extracted can also include grid features (e.g. physical characteristics of the NoC).

Figure 5:
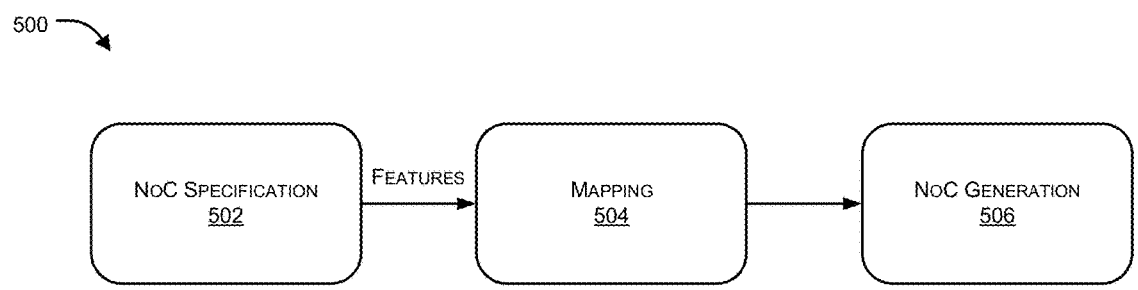
FIG. 5 illustrates an example high-level design of a system for generating a NoC in accordance with an example implementation.

FIG. 5 illustrates an exemplary high-level design 500 of a system for generating a NoC in accordance with an example implementation. As can be seen from the example representation of FIG. 5, the present disclosure provides a mechanism for extracting features from a NoC specification for machine learning (ML) construction. The present disclosure enables extraction of features from NoC specification for ML based NoC construction so as to determine quality metrics for NoC.

In an example implementation, NoC specification, apart from above discussed contents, can include, in a non-limiting manner, host/agent (parameters and locations), bridges (parameters and location), traffic, number of layers, clock domains (number of domains, frequency, assignment to host/agents/bridges), size of grid (x/y), interfaces/width of interfaces/properties of interfaces.

In an example implementation, system of the present disclosure can extract some features/certain number of the elements from the NOC specification that characterizes the NOC and that may be constant throughout the different specifications that are obtained/received.

In an embodiment, the present disclosure, as shown in FIG. 5, given the NoC specification 502, can extract a vector of features that can be compared to other NoCs, thereby creating a common representation to transform the network, and can also have reference for all possible NoCs independent of their size. In an embodiment, the vector can include NoC generation parameters corresponding to each of the strategies from the plurality of NoC generation strategies to be used to generate the NoC. In an embodiment, the plurality of strategies can include separation of request and response traffic on at least one of different links, different virtual channels, and different layers, and separation of single and multibeast traffic on at least one of the different links, the different virtual channels, and the different layers.

In an example implementation, extracted features can be represented in the form of a bit vector. Alternatively, each of the extracted features can be identified and a vector can be created based on respective values thereof. It is to be appreciated that such-proposed representation technique is completely exemplary in nature, and any other manner in which strategies can be selected using machine learning is completely within the scope of the present disclosure.

In an aspect, the present disclosure relates to NoC construction using machine learning. In particular, the present disclosure relates to determining one or more strategies for NoC configuration/construction using machine learning based on features extracted from NoC specification provided by a user. One or more of such strategies may be configured in a manner such that their values are binary i.e. either the strategy is used or is not used for NoC construction. Machine learning of the present invention can therefore help understand which of a plurality of strategies should be used for a given NoC specification, and what the values for each of the selected strategies should be in order to construct an optimal NoC based on the input NoC specification.

In an aspect, a input NoC specification can be specified in the form of one or more features, which can be processed using machine learning to identify one or more strategies using which NoC can be constructed.

In an embodiment, upon extraction of features from input NoC specification, the extracted features can be fed to a machine learning algorithm (MLA) having one or more mapping strategies 504, and output one or a combination of mapping strategies having an optimal/desired cost function for NoC construction.

In an embodiment, the present disclosure as shown in FIG. 5 can utilize the output of the mapping strategies 504 i.e., evaluate quality for each mapping strategy and identify the best mapping strategies for a desired cost function so as to generate a NoC 506.

Figure 6A:
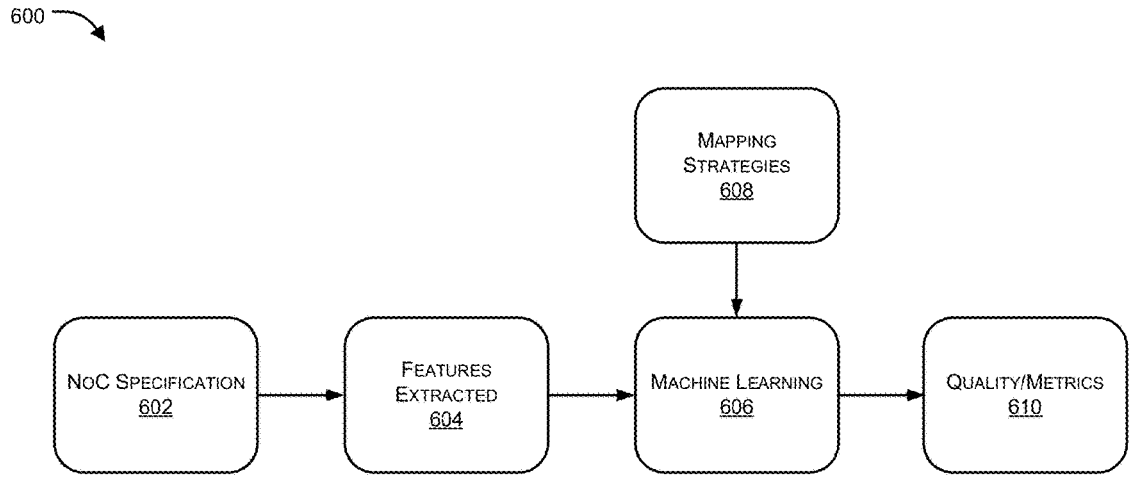
FIG. 6A illustrates an example low-level design of a system for generating a NoC in accordance in accordance with an example implementation.

FIG. 6A illustrates an example low-level design 600 of a system for generating a NoC in accordance with an example implementation. As can be seen from the example representation of FIG. 6, a NoC specification 602 can be fed to a system to extract a vector of features 604 that can be compared to other NoCs, thereby creating a common representation to transform the network, and can have reference for all possible NoCs, independent of their respective sizes. After feature extraction is conducted, system of the present disclosure can apply the extracted features to a machine learning algorithm 606 that can also be fed with a plurality of mapping strategies 608, so as to output 610 a quality/metric for one or more of the plurality of mapping strategies.

Figure 6B:
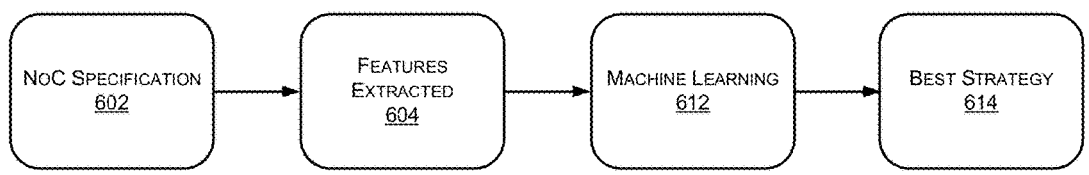
FIG. 6B illustrates another example low-level design of a system for generating a NoC in accordance with an example implementation.

FIG. 6B illustrates another example low-level design 600 of a system for generating a NoC in accordance with an example implementation. As shown in the example representation of FIG. 6, a NoC specification 602 can be fed to a system to extract a vector of features 604 that can be compared to other NoCs, thereby creating a common representation to transform the network, and can have reference for all possible NoCs, independent of their respective sizes. After feature extraction is conducted, system of the present disclosure can apply machine learning algorithm 612 that may be fed with a plurality of mapping strategies, and output 614 the best mapping strategies for a desired cost function.

Figure 7:
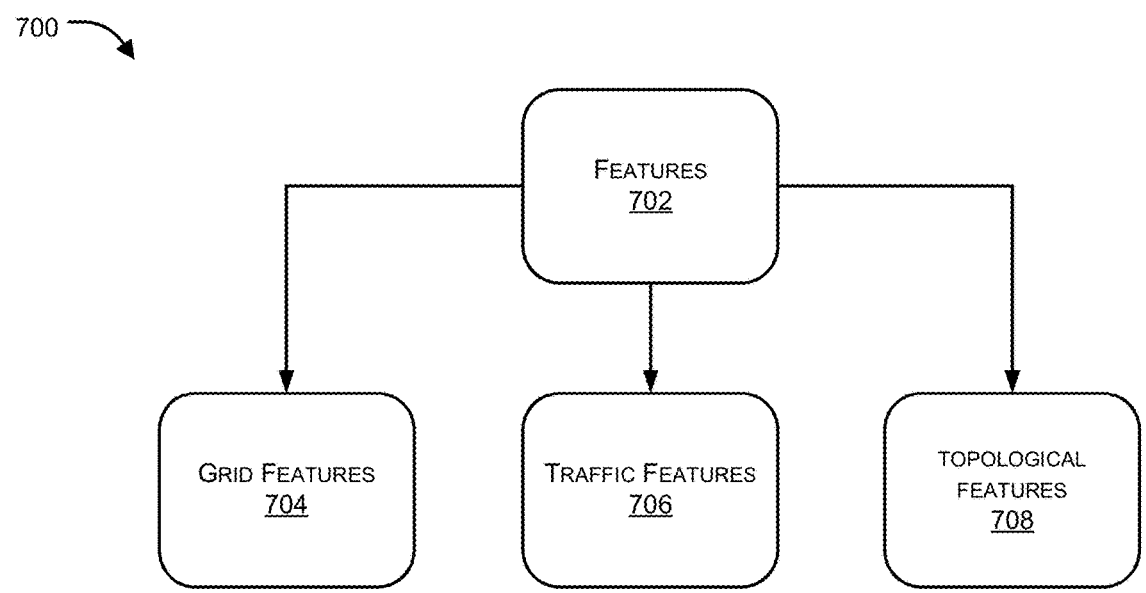
FIG. 7 illustrates an example features associated with NoC specification in accordance with an example implementation.

FIG. 7 illustrates example features 700 associated with NoC specification in accordance with an example implementation. The NoC specification can include constraints such as bandwidth/Quality of Service (QoS)/latency attributes that are to be met by the NoC, and can be in various software formats depending on design tools utilized. Once the NoC is generated through the use of design tools on the specification in order to meet the specification requirements, physical architecture can be implemented either by manufacturing a chip layout to facilitate the NoC or by generation of a register transfer level (RTL) for execution on a chip to emulate the generated NoC, depending on the desired implementation. Specifications may be in common power format (CPF), Unified Power Format (UPF), or others according to the desired specification. Specifications can be in the form of traffic specifications indicating traffic, bandwidth requirements, latency requirements, interconnections, etc depending on desired implementation. Specifications can also be in the form of power specifications to define power domains, voltage domains, clock domains, and so on, depending on desired implementation. Specification can include parameters for bandwidth, traffic, jitter, dependency information, and attribute information depending on desired implementation. In addition to this, information such as position of various components, protocol information, clocking and power domains, etc. may be supplied.

Details/constraints/parameters associated with any features associated with NoC can be extracted/retrieved from the specification, of which a few parameters associated with few features/specifications are shown for clarity. However, other features are also possible in accordance with the desired implementation, and the example is not intended to be limiting.

As shown in the example representation of FIG. 7, the present disclosure can extract few features 702 such as grid features 704, traffic features 706, and topological features 708.

In an example implementation, for conducting feature processing/extraction of NoC specification to derive grid features, the traffic features and the topological features, system and method of the present disclosure can determine blockages of links and nodes of the NoC, remove locations of the NoC without bridges or link blockages based on blockages and bridge positions of the NoC, determine a bounding area for the NoC based on removal of locations, project the bounding area onto a grid, and determine bridge positions and link availability from the grid.

In an example implementation, the grid obtained upon projecting the bounding area is different from the bounding area i.e., the grid obtained is a new grid.

In an example implementation, grid features can include features related to grid by itself. Features related to the grid may include, but are not limited to, protocol, number of hosts, number of agents, number of bridges, number of layers, number of elements, clock domains, frequencies, and the like that can be extracted through the specification directly.

In an example implementation, for conducting feature processing/extraction of NoC specification to derive grid features, the traffic features and the topological features, system and method of the present disclosure can determine blockages of links and hosts, keep bridge positions and links available (ignore hosts), extract the bounding box by removing all rows/columns without bridges or link blockages, and then project the bounding box (m grid) to the M16 grid or other desired dimension grid (e.g. m4 grid), and captures bridge positions and availability of the grid and links for every NoC.

Figure 8A:
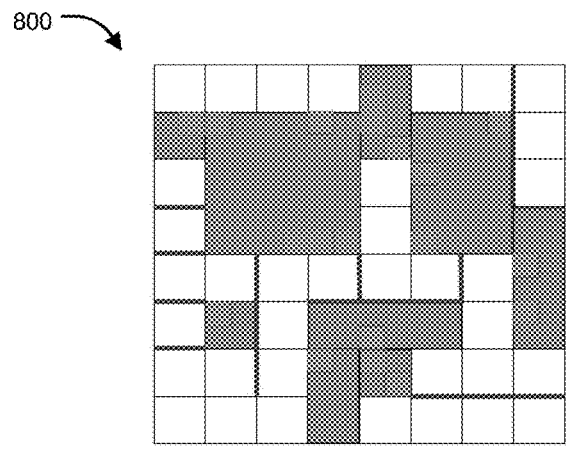
FIGS. 8A-8F illustrates an example process for formation of grids in accordance with an example implementation.
Figure 8B:
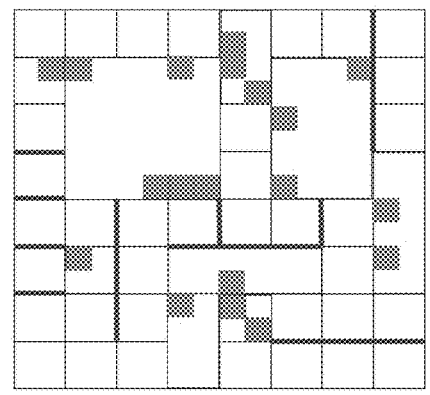
Figure 8C:
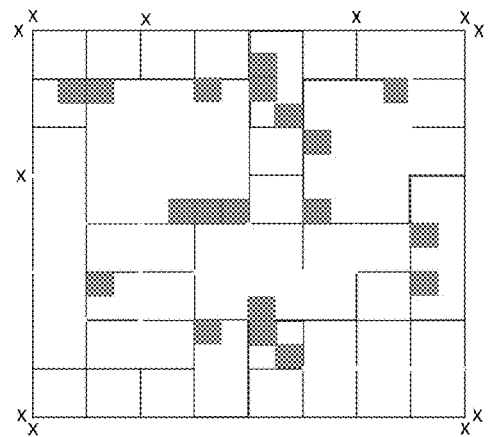
Figure 8D:
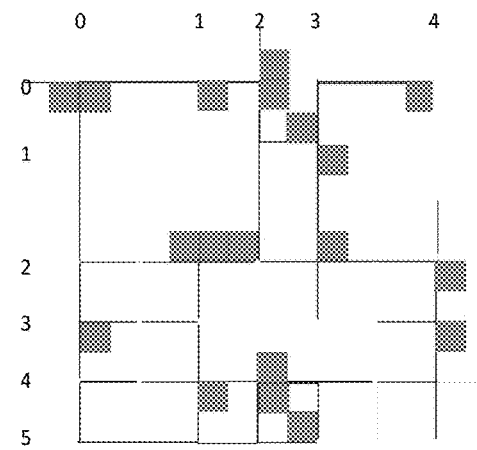
Figure 8E:
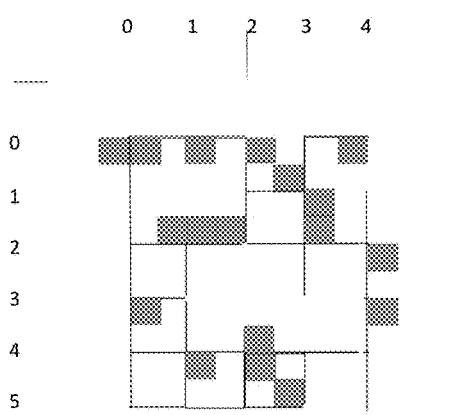
Figure 8F:
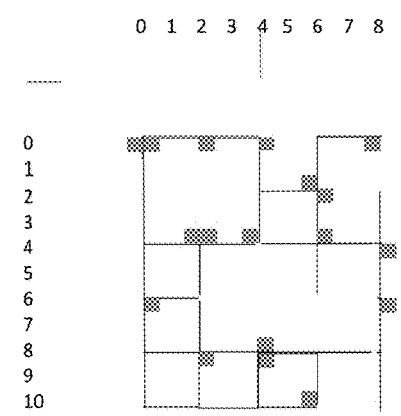

FIGS. 8A-8F illustrates an example process 800 for formation of grids in accordance with an example implementation. FIG. 8A illustrates original grid with host bridges and port blockages. FIG. 8B illustrates a grid obtained after ignoring hosts and treating overlapping links as blockages. FIG. 8C illustrates a grid obtained after ignoring port blockages. FIG. 8D illustrates a grid after removing columns and rows at which no bridges are connected. FIG. 8E illustrates columns height and rows width being adjusted. It may be noted that this step may be for mere display purpose. FIG. 8F illustrates a look of a 2× expanded grid. It is to be noted that 2× expanded grid is an identical structure of the original grid. The shrinking is similar except during shrinking, the number of links may reduce because they may overlap and get combined. Thus, FIGS. 8A-8F steps are utilized to obtain M16 and M4 grids from M grid.

In an example implementation, the grid obtained can be an expansion or compression or a sort of projection of the features extracted in 16×16 form matrix. It can be bigger or smaller than 16×16. In an implementation, if the grid is smaller, it can be expanded into 16×16 form grid by projecting the position of each bridge to the corresponding NoC.

In an example implementation, the bounding box (m grid) can be projected to the M16 grid or other desired dimension grid (e.g. M4 grid). Projection of m grid into a grid i.e. 4×4 or 16×16, in a non-limiting embodiment, can be divided into 4 quadrants and then each quadrant represents details of each respective node.

In an implementation, the bounding box can be projected onto different grids as there is a requirement of smaller grid or representing only few set of features. Therefore, the representation can be independent of the size of the original grid.

In an example implementation, the traffic features include but are not limited to the rate of traffic between the transmitter (Tx) and the receiver (Rx) per node (m16), the transmitter and the receiver per interfaces, rate of traffic from node x to node y (e.g. m16 or m4), number of even or odd bridges (master or slaves), total rate of traffic per interface (sum of Tx/Rx) can be extended per node, high or low bandwidth at Tx/Rx interface per even/odd hop (wherein high bandwidth if the interface rate is greater than a certain threshold), number of congested interfaces per even/odd hop (wherein is congested if the sum of all of the flows specified is greater than 1), number of single/multi-beast interfaces, number of different QoS's per interface (extended per node based on the requirements of the features), and the like that can be extracted through the specification directly.

In an example implementation, the traffic features can be obtained by extracting the at least one feature can also include high/low bandwidth requirement, number of odd/even transmission (tx)/receiver (rx) interfaces per node, number of congested tx/rx interfaces per node, number of flows per tx/rx interface.

In an example implementation, the traffic features can be obtained by capturing the amount of traffic that is generated, transmitted from each node of the grid or received to each node. Examples can include the amount of traffic that is transmitted or received by the transmitted and/or receiver, or by each pair of by each pair of interfaces.

Figure 9A:
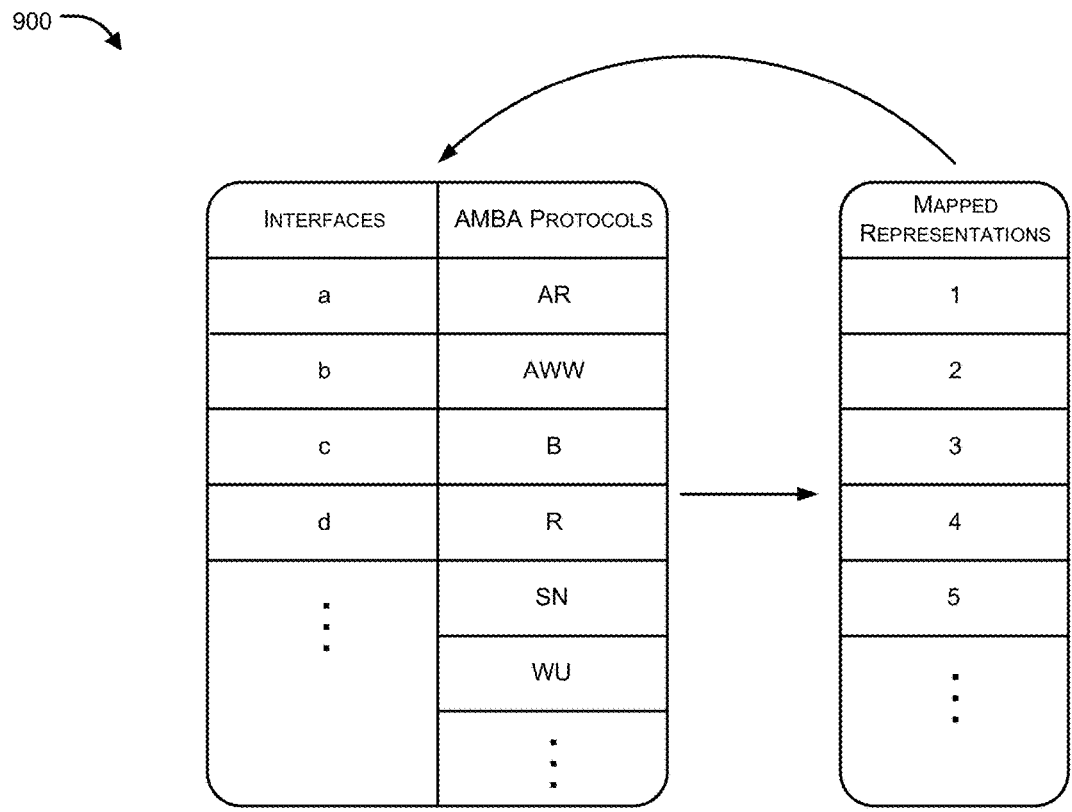
FIG. 9A illustrates an example process for interface abstraction in accordance with an example implementation.
Figure 9B:
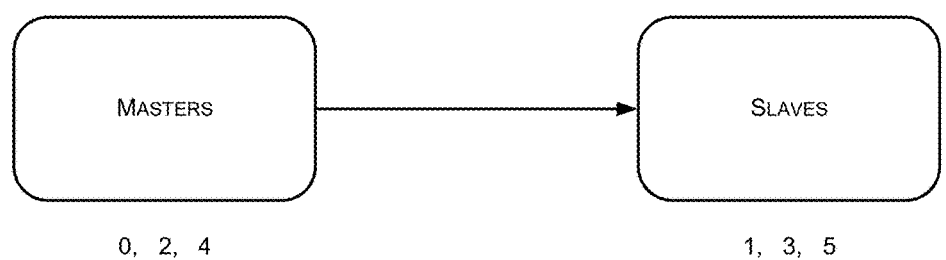
FIG. 9B illustrates an example process for a bridge abstraction in accordance with an example implementation.

In an example implementation, the traffic feature can be extracted from the NoC specification by determining one or more transmission rates and/or one or more receiving rates of each node of the NoC, determining a number of single beat and multi-beat interfaces per node, and determining a number of even bridges and odd bridges for each node of the NoC as described in FIG. 9B.

In an example implementation, interface abstractions can be utilized to have a common representation of the interfaces. FIG. 9A illustrates an example process for an interfaces abstraction 900 in accordance with an example implementation. As shown in FIG. 9A, any protocol from the different protocols being used can be combined with any interface from the interfaces in communication to correspond to an entry in the mapped representation. Each representation in the mapped representation can therefore represent a combination between a protocol and an interface.

In an example implementation, bridge abstractions can be identified based on the traffic if the bridge is at an even position or an odd position on the chain. The odd/even positions are used to identify if it is a master or a slave. FIG. 9B illustrates an example process for a bridge abstraction in accordance with an example implementation. As shown in FIG. 9B, the odd position indicates that the node is a slave node, whereas the even position indicates that the node is a master node. Based on the determination of if a bridge is even or odd, the bridge can be grouped based on its behavior as a master or a slave even in situations where master and slave are not defined. For example, if the traffic sequence is master to slave to master to slave and so on (or source to destination, to source to destination and so on), then in such a scenario, the number of the first master bridge is determined (e.g. even or odd), and based on the determination, all bridges having the same even or odd determination are grouped together as a master bridge.

In an example implementation, the traffic feature can be extracted from the NoC specification by determining a representation for an each interface of the NoC based on a determination of an interface type from a plurality of interface types for the each interface, and determining, based on at least one traffic flow of the NoC, a type of each bridge based on an even or an odd hop position of the each bridge within the at least one traffic flow. In an example implementation, the type of each bridge can generally be determined based on the position of the bridge in the NoC.

In an example implementation, the topological features may include, but are not limited to the list of links available per pair of nodes x, y, for example, if the transcript or list of links available for mapping is M16, then take each pair of nodes and describe availability along x and y, and the like features that can be extracted through the specification directly.

In an example implementation, the features extracted can also include grid features (e.g. physical characteristics of the NoC).

Figure 10:
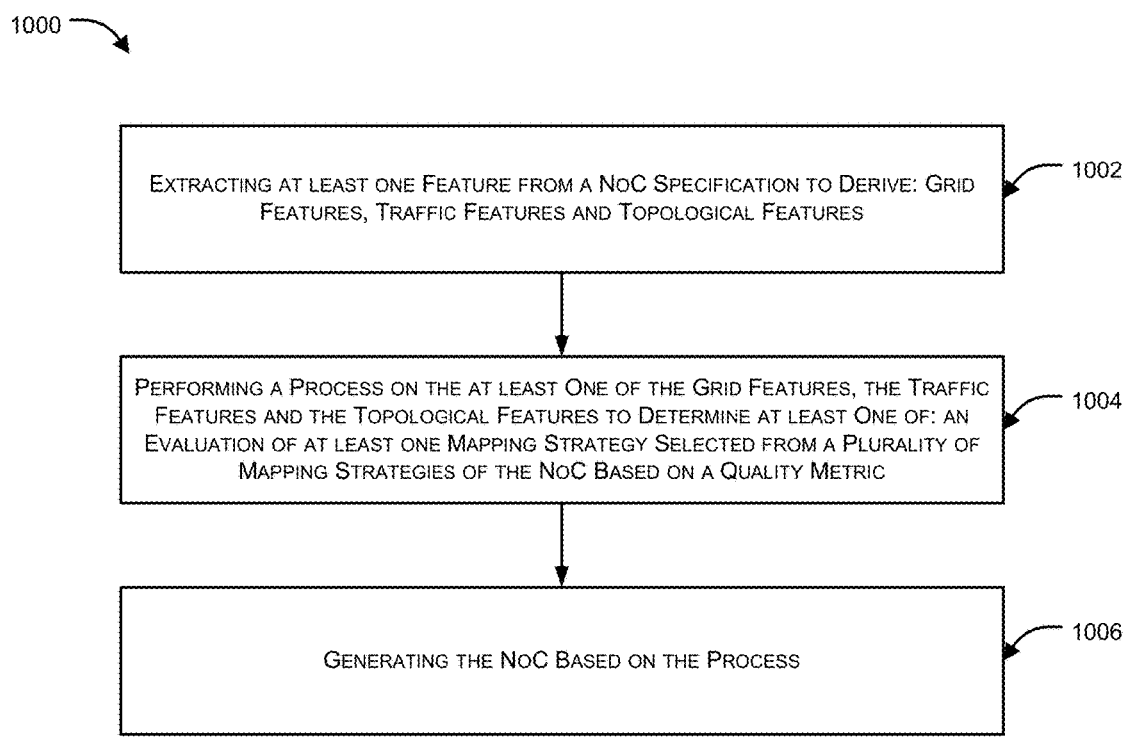
FIG. 10 illustrates an example flow diagram for generating a Network on Chip (NoC) in accordance with an example implementation

FIG. 10 illustrates an example flow diagram 1000 for generating a Network on Chip (NoC) in accordance with an example implementation. This example process is merely illustrative, and therefore other processes may be substituted as would be understood by those skilled in the art. Further, this process may be modified, by adding, deleting or modifying operations, without departing from the scope of the inventive concept.

As shown in FIG. 10, at 1002, at least one feature can be extracted from a NoC specification to derive at least one of: grid features, traffic features and topological features associated with the NoC. In an example implementation, a vector of features can be extracted from the NoC specification that can be compared to other NoCs, thereby creating a common representation to transform the network, and can have reference for all possible NoCs independent of size.

In an example implementation, to extract the at least one feature from the NoC specification to derive the grid features the flow at 1002 can determine blockages associated with one or more links and one or more nodes of the NoC, remove locations of the one or more nodes without one or more bridges or blockages associated with the one or more links based on the blockages and bridge positions of the NoC, determine a bounding area for the NoC based on the removal of the locations, project the bounding area onto a grid, and determine the bridge positions and availability of the one or more links from the grid.

In an example implementation, the grid obtained upon projecting the bounding area is different from the bounding area i.e., the grid obtained is a new grid.

In an example implementation, to extract the at least one feature from the NoC specification to derive the topological features the flow at 1002 can determine a list of links available per pair of nodes of the NoC. In an example implementation, the features extracted can also include grid features (e.g. physical characteristics of the NoC).

In an example implementation, to extract the at least one feature from the NoC specification to derive the traffic features the flow at 1002 can determine a representation for an each interface of the NoC based on a determination of an interface type from a plurality of interface types for the each interface, and determine, based on at least one traffic flow of the NoC, a type of each bridge based on an even or an odd hop position of the each bridge within the at least one traffic flow. In an example implementation, the type of each bridge can be generally determined based on the position of the bridge in the NoC.

In an example implementation, to extract the at least one feature from the NoC specification to derive the traffic features the flow at 1002 can determine one or more transmission rate and/or one or more receiving rates of each node of the NoC, determine a number of single beat and multi-beat interfaces per node, determine a number of even bridges and odd bridges for each node of the NoC.

At 1004, after the feature extraction is performed, the features are fed to a machine learning algorithm having one or more mapping strategies, to output a quality for a mapping strategy, or best mapping strategies for a desired cost function.

In an example implementation, the quality metric can be based on at least one of: a link cost or a flop cost or a latency cost or a bandwidth cost.

In an example implementation, at the flow at 1004, a process is performed on the at least one of the grid features, the traffic features and the topological features associated with the NoC to determine at least one of an evaluation of at least one mapping strategy selected from a plurality of mapping strategies of the NoC based on a quality metric, and the selection of the at least one mapping strategy is based on the quality metric.

In example implementation, the process is a machine learning process generated through a machine learning method trained for a plurality of NoC generation strategies for a quality metric based on an application of the grid features, the traffic features and the topological features of the NoC.

At the flow at 1006, the NoC can be generated based output i.e., a quality for a mapping strategy, or best mapping strategies for a desired cost function generated in the flow at 1004.

Figure 11:
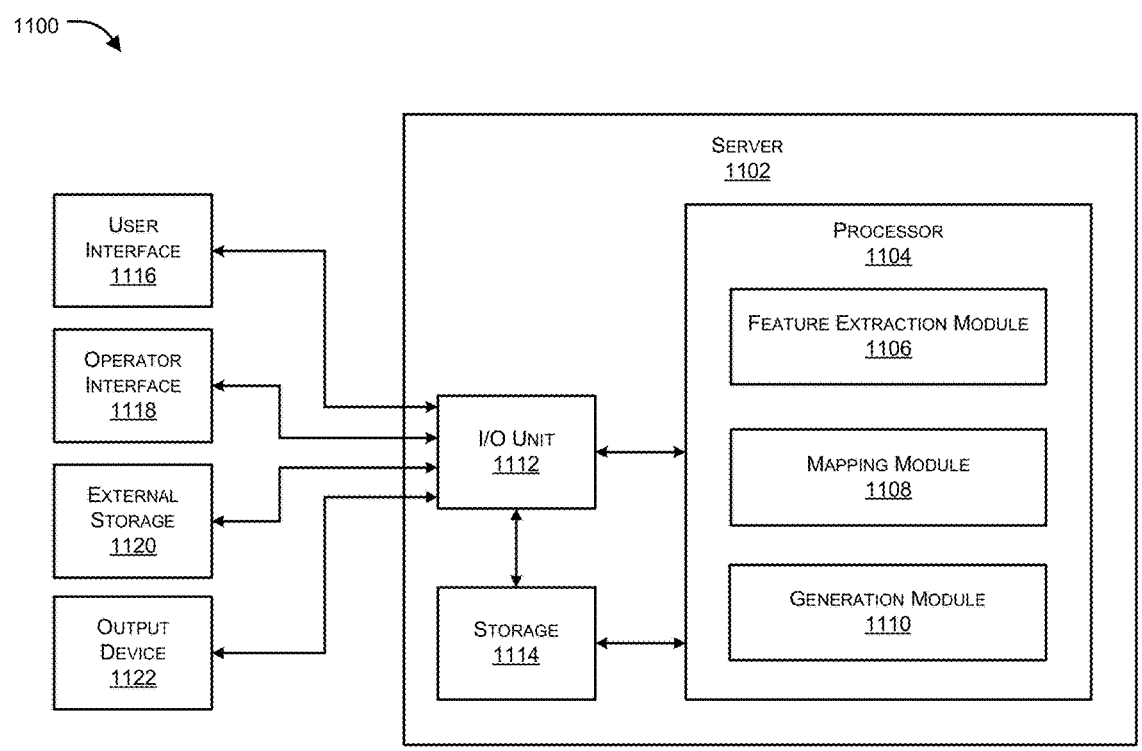
FIG. 11 illustrates an example computer system on which example embodiments may be implemented.

FIG. 11 illustrates an example computer system 1100 on which example embodiments may be implemented. This example system is merely illustrative, and other modules or functional partitioning may therefore be substituted as would be understood by those skilled in the art. Further, this system may be modified by adding, deleting, or modifying modules and operations without departing from the scope of the inventive concept.

In an aspect, computer system 1100 includes a server 1102 that may involve an I/O unit 1112, storage 1114, and a processor 1104 operable to execute one or more units as known to one skilled in the art. The term "computer-readable medium" as used herein refers to any medium that participates in providing instructions to processor 1104 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 1116 and operator interfaces 1118 which may utilize input devices such as a keyboard, mouse, touch device, or verbal command The server 1102 may also be connected to an external storage 1120, which can contain removable storage such as a portable hard drive, optical media (CD or DVD), disk media or any other medium from which a computer can read executable code. The server may also be connected an output device 1122, such as a display to output data and other information to a user, as well as request additional information from a user. The connections from the server 1102 to the user interface 1116, the operator interface 1118, the external storage 1120, and the output device 1122 may via wireless protocols, such as the 802.11 standards, Bluetooth® or cellular protocols, or via physical transmission media, such as cables or fiber optics. The output device 1122 may therefore further act as an input device for interacting with a user The processor 1104 can include a feature extraction module 1106, a mapping module 1108, and a generation module 1110. In an example implementation, the feature extraction module 1106 can extract at least one feature from a NoC specification to derive at least one of: grid features, traffic features and topological features associated with the NoC. The mapping module 1108 can perform a process on the at least one of the grid features, the traffic features and the topological features associated with the NoC to determine at least one of an evaluation of at least one mapping strategy selected from a plurality of mapping strategies of the NoC based on a quality metric, and the selection of the at least one mapping strategy is based on the quality metric. The generation module can generate the NoC based on the process.

In an example embodiment, the process performed by the mapping module 1108 is a machine learning process generated through a machine learning method trained for a plurality of NoC generation strategies for a quality metric based on an application of the grid features, the traffic features and the topological features of the NoC.

In an example implementation, the feature extraction module 1106 derives the grid features can determine blockages associated with one or more links and one or more nodes of the NoC, remove locations of the one or more nodes without one or more bridges or blockages associated with the one or more links based on the blockages and bridge positions of the NoC, determine a bounding area for the NoC based on the removal of the locations, project the bounding area onto a grid, and determine the bridge positions and availability of the one or more links from the grid.

In an example implementation, the grid obtained upon projecting the bounding area is different from the bounding area i.e., the grid obtained is a new grid.

In an example implementation, the feature extraction module 1106 derives the topological features by determining a list of links available per pair of nodes of the NoC.

In an example implementation, the feature extraction module 1106 derives the traffic features can determine a representation for an each interface of the NoC based on a determination of an interface type from a plurality of interface types for the each interface, and determine, based on at least one traffic flow of the NoC, a type of each bridge based on an even or an odd hop position of the each bridge within the at least one traffic flow. In an example implementation, the type of each bridge can generally be determined based on the position of the bridge in the NoC In an example implementation, the feature extraction module 1106 derives the traffic features can determine one or more transmission rate and/or one or more receiving rates of each node of the NoC, determine a number of single beat and multi-beat interfaces per node, and determine a number of even bridges and odd bridges for each node of the NoC.

In an example implementation, the quality metric can be based on parameters such as but not limited to a link cost or a flop cost or a latency cost or a bandwidth cost.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

The invention claimed is:

1. A method for generating a Network on Chip (NoC), comprising:
   extracting at least one feature from a NoC specification to derive at least one of: grid features, traffic features, and topological features associated with the NoC;
   performing a process on the at least one of the grid features, the traffic features, and the topological features associated with the NoC to determine at least one of:
      an evaluation of at least one mapping strategy selected from a plurality of mapping strategies of the NoC based on a quality metric, and the selection of the at least one mapping strategy is based on the quality metric; and
   generating the NoC based on the process;
   wherein the process is a machine learning process generated through a machine learning method trained for a plurality of NoC generation strategies for the quality metric based on an application of the grid features, the traffic features, and the topological features of the NoC.

2. The method according to claim 1, wherein extracting the at least one feature from the NoC specification to derive the grid features, the traffic features and the topological features comprises:
   determining blockages associated with one or more links and one or more nodes of the NoC;
   removing locations of the one or more nodes without one or more bridges or blockages associated with the one or more links based on the blockages and bridge positions of the NoC;
   determining a bounding area for the NoC based on the removal of the locations;
   projecting the bounding area onto a grid; and
   determining the bridge positions and availability of the one or more links from the grid.

3. The method according to claim 1, wherein extracting the at least one feature from the NoC specification to derive the topological features comprises: determining a list of links available per pair of nodes of the NoC.

4. The method according to claim 1, wherein extracting the at least one feature from the NoC specification to derive the traffic features comprises:

determining a representation for an each interface of the NoC based on a determination of an interface type from a plurality of interface types for the each interface;

determining, based on at least one traffic flow of the NoC, a type of each bridge based on an even or an odd hop position of the each bridge within the at least one traffic flow.

5. The method according to claim 1, wherein extracting the at least one feature from the NoC specification to derive the traffic features comprises:

determining one or more transmission rate and/or one or more receiving rates of each node of the NoC;

determining a number of single beat and multi-beat interfaces per node; and determining a number of even bridges and odd bridges for each node of the NoC.

6. The method according to claim 1, wherein the quality metric is based on at least one of: a link cost or a flop cost or a latency cost or a bandwidth cost.

7. A system for generating a Network on Chip (NoC), comprising:

a processor, configured to:

extract at least one feature from a NoC specification to derive at least one of: grid features, traffic features and topological features associated with the NoC;

perform a process on the at least one of the grid features, the traffic features and the topological features associated with the NoC to determine at least one of:

an evaluation of at least one mapping strategy selected from a plurality of mapping strategies of the NoC based on a quality metric, and the selection of the at least one mapping strategy is based on the quality metric; and generate the NoC based on the process;

wherein the process is a machine learning process generated through a machine learning method trained for a plurality of NoC generation strategies for a quality metric based on an application of the grid features, the traffic features and the topological features of the NoC.

8. The system according to claim 7, wherein the processor, to derive the grid features, the traffic features and the topological features is further configured to:

determine blockages associated with one or more links and one or more nodes of the NoC;

remove locations of the one or more nodes without one or more bridges or blockages associated with the one or more links based on the blockages and bridge positions of the NoC;

determine a bounding area for the NoC based on the removal of the locations;

project the bounding area onto a grid; and determine the bridge positions and availability of the one or more links from the grid.

9. The system according to claim 7, wherein the processor is further configured to determine a list of links available per pair of nodes of the NoC.

10. The system according to claim 7, wherein the processor is further configured to:

determine a representation for an each interface of the NoC based on a determination of an interface type from a plurality of interface types for the each interface;

determine, based on at least one traffic flow of the NoC, a type of each bridge based on an even or an odd hop position of the each bridge within the at least one traffic flow.

11. The system according to claim 7, wherein the processor is further configured to:

determine one or more transmission rate and/or one or more receiving rates of each node of the NoC;

determine a number of single beat and multi-beat interfaces per node; and determine a number of even bridges and odd bridges for each node of the NoC.

12. The system according to claim 7, wherein the quality metric is based on at least one of: a link cost or a flop cost or a latency cost or a bandwidth cost.

13. A non-transitory computer readable storage medium storing instructions for executing a process, the instructions comprising:

extracting at least one feature from a NoC specification to derive at least one of: grid features, traffic features and topological features associated with the NoC;

performing a process on the at least one of the grid features, the traffic features and the topological features associated with the NoC to determine at least one of:

an evaluation of at least one mapping strategy selected from a plurality of mapping strategies of the NoC based on a quality metric, and the selection of the at least one mapping strategy is based on the quality metric; and generating the NoC based on the process;

wherein the process is a machine learning process generated through a machine learning method trained for a plurality of NoC generation strategies for the quality metric based on an application of the grid features, the traffic features and the topological features of the NoC.

14. The non-transitory computer readable storage medium according to claim 13, wherein the instructions for extracting the at least one feature from the NoC specification to derive the grid features, the traffic features and the topological features comprises:

determining blockages associated with one or more links and one or more nodes of the NoC;

removing locations of the one or more nodes without one or more bridges or blockages associated with the one or more links based on the blockages and bridge positions of the NoC;

determining a bounding area for the NoC based on the removal of the locations;

projecting the bounding area onto a grid; and determining the bridge positions and availability of the one or more links from the grid.

15. The non-transitory computer readable storage medium according to claim 13, wherein the instructions for extracting the at least one feature from the NoC specification to derive the topological features comprises: determining a list of links available per pair of nodes of the NoC.

16. The non-transitory computer readable storage medium according to claim 13, wherein the instructions for extracting the at least one feature from the NoC specification to derive the traffic features comprises:

determining a representation for an each interface of the NoC based on a determination of an interface type from a plurality of interface types for the each interface;

determining, based on at least one traffic flow of the NoC, a type of each bridge based on an even or an odd hop position of the each bridge within the at least one traffic flow.

17. The non-transitory computer readable storage medium according to claim 13, wherein the instructions for extracting the at least one feature from the NoC specification to derive the traffic features comprises:

determining one or more transmission rate and/or one or more receiving rates of each node of the NoC;

determining a number of single beat and multi-beat interfaces per node; and determining a number of even bridges and odd bridges for each node of the NoC.

18. The non-transitory computer readable storage medium according to claim 13, wherein the quality metric is based on at least one of: a link cost or a flop cost or a latency cost or a bandwidth cost.

19. The non-transitory computer readable storage medium according to claim 13, wherein the instructions for extracting the at least one feature from the NoC specification to derive the grid features comprises:

extracting, from the NoC specification, physical characteristics of the NoC.

\* \* \* \* \*